United States Patent
Yang

(10) Patent No.: US 8,242,754 B2
(45) Date of Patent: Aug. 14, 2012

(54) RESONANT POWER CONVERTER WITH HALF BRIDGE AND FULL BRIDGE OPERATIONS AND METHOD FOR CONTROL THEREOF

(75) Inventor: Ta-Yung Yang, Milpitas, CA (US)

(73) Assignee: System General Corp., New Taipei (TW)

( * ) Notice: Subject to any disclaimer, the term of this patent is extended or adjusted under 35 U.S.C. 154(b) by 376 days.

(21) Appl. No.: 12/618,783

(22) Filed: Nov. 16, 2009

(65) Prior Publication Data

US 2011/0038180 A1 Feb. 17, 2011

Related U.S. Application Data

(60) Provisional application No. 61/274,298, filed on Aug. 14, 2009.

(51) Int. Cl.
*G05F 1/70* (2006.01)
(52) U.S. Cl. ............... 323/207; 363/16; 363/17
(58) Field of Classification Search .................. 323/207; 363/16, 17, 132
See application file for complete search history.

(56) References Cited

U.S. PATENT DOCUMENTS 7,313,004 B1 12/2007 Yang et al.
8,085,556 B2 * 12/2011 Moussaoui ............... 363/17

FOREIGN PATENT DOCUMENTS

CN 1374740 A 10/2002

OTHER PUBLICATIONS

"First Office Action of China Counterpart Application", issued on May 17, 2011, p1-p4, in which the listed reference was cited.

* cited by examiner

*Primary Examiner* — Shawn Riley
(74) *Attorney, Agent, or Firm* — Jianq Chyun IP Office

(57) ABSTRACT

A resonant power converter with half bridge and full bridge operations and a method for control thereof are provided. The resonant power converter includes a full bridge circuit, a control circuit and a PFC circuit. The full bridge circuit switches a power transformer in response to switching signals. The control circuit coupled to receive a feedback signal and an input signal generates switching signals. The feedback signal is correlated to the output of the power converter and the input signal is correlated to the input voltage of the full bridge circuit, where the full bridge circuit is operated as a full bridge switching when the input signal is lower than a threshold, and the full bridge circuit is operated as a half bridge switching when the input signal is higher than the threshold. The PFC circuit generates the input voltage of the full bridge circuit.

8 Claims, 9 Drawing Sheets

RESONANT POWER CONVERTER WITH HALF BRIDGE AND FULL BRIDGE OPERATIONS AND METHOD FOR CONTROL THEREOF

CROSS-REFERENCE TO RELATED APPLICATION

This application claims the priority benefit of U.S. provisional application Ser. No. 61/274,298, filed on Aug. 14, 2009. The entirety of the above-mentioned patent application is hereby incorporated by reference herein and made a part of specification.

BACKGROUND OF THE INVENTION

1. Field of the Invention

The present invention relates to a resonant power converter, and more particularly, relates to a resonant power converter with half bridge and full bridge operations and method for control thereof.

2. Description of Related Art

The resonant power converter is a high efficiency power converter. Its prior art can be found in "Switching controller for resonant power converter" by Yang et al., U.S. Pat. No. 7,313,004. The drawback of the resonant power converter is its narrow operation range. It cannot be operated in a wide input voltage range.

SUMMARY OF THE INVENTION

The object of the present invention is to provide a control scheme to solve this problem. It allows the resonant power converter can be operated in wide input range. The present invention provides a resonant power converter with half bridge and full bridge operations and a method for control thereof.

According an exemplary embodiment of the present invention, a resonant power converter with half bridge and full bridge operations is provided. The resonant power converter includes a full bridge circuit, a control circuit and a PFC circuit. The full bridge circuit switches a power transformer in response to switching signals. The control circuit coupled to receive a feedback signal and an input signal generates switching signals. The feedback signal is correlated to an output of the power converter and the input signal is correlated to an input voltage of the full bridge circuit, where the full bridge circuit is operated as a full bridge switching when the input signal is lower than a threshold, and the full bridge circuit is operated as a half bridge switching when the input signal is higher than the threshold. The PFC circuit generates the input voltage of the full bridge circuit.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
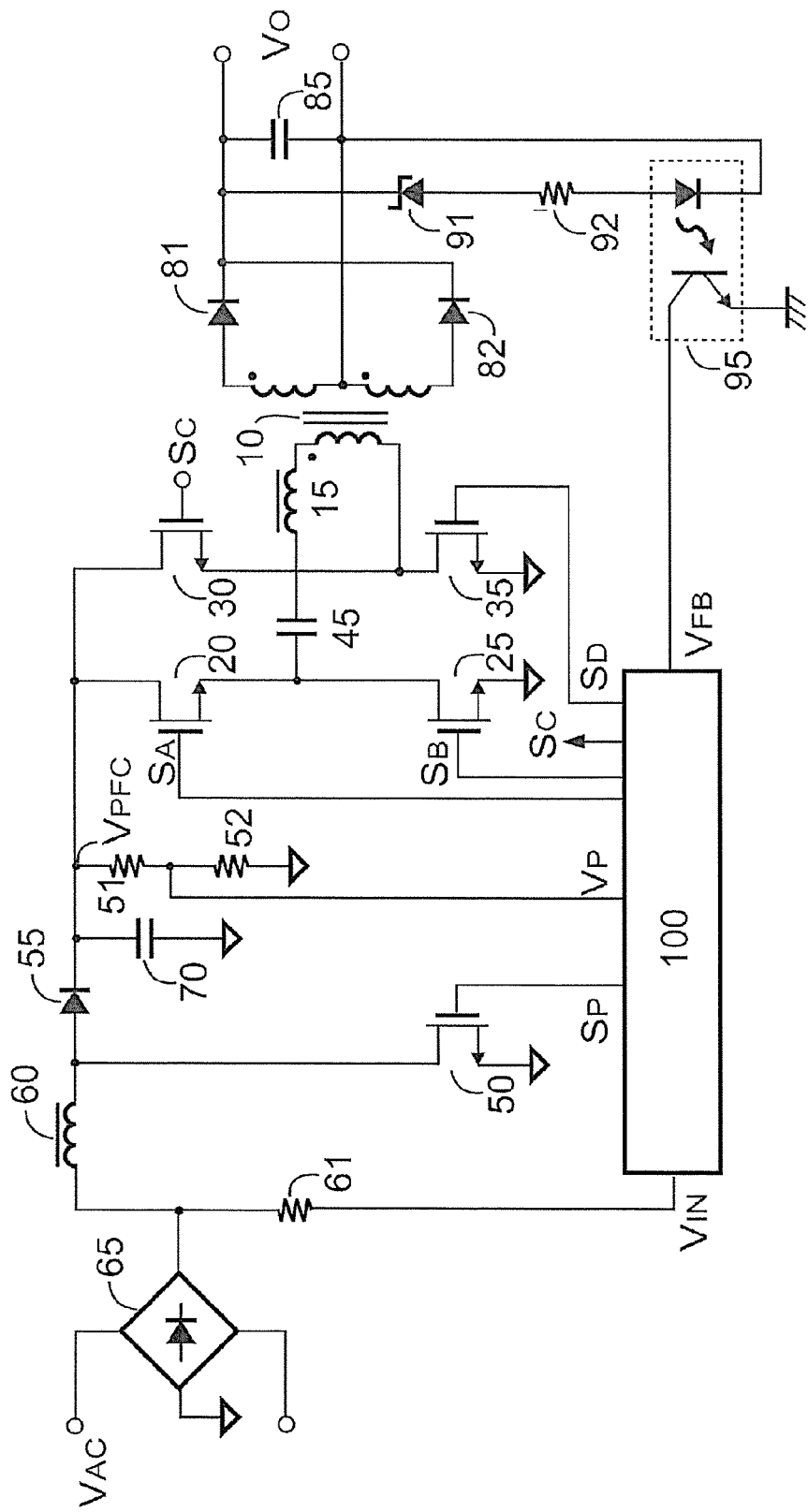
FIG. 1 shows a power converter in accordance with a preferred embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 shows a power converter in accordance with a preferred embodiment of the present invention. A capacitor 45 and an inductive device (such as a transformer 10 and its parasitic inductor 15) develop a resonant tank. Transistor 20, 25 and 30, 35 develop a full bridge circuit to switch the resonant tank. Two rectifiers 81 and 82 are connected from the secondary winding of the transformer 10 to the output capacitor 85 for generating an output $V_O$ at the capacitor 85. A control circuit 100 generates switching signals $S_A$, $S_B$, $S_C$, $S_D$ to control the transistors 20, 25, 30, 35 respectively. The switching signal $S_A$ is contrast with the switching signal $S_B$. The switching signal $S_C$ is contrast with the switching signal $S_D$. A delay time (dead time) is developed in between the turning on and turning off the switching signals $S_A$, $S_B$, $S_C$, $S_D$. The switching frequency of the switching signals $S_A$, $S_B$, $S_C$, $S_D$ is varied in accordance with a feedback signal $V_{FB}$ for regulating the output $V_O$. A zener diode 91, a resistor 92 and an optical-coupler 95 form a feedback circuit coupled to the output $V_O$ of the power converter to generate the feedback signal $V_{FB}$.

The control circuit 100 is further coupled to receive an input signal $V_P$ for generating switching signals $S_A$, $S_B$, $S_C$, $S_D$. Resistors 51 and 52 develop a voltage divider coupled to the input voltage $V_{PFC}$ of the full bridge circuit to generate the input signal $V_P$. The full bridge circuit is operated as a full bridge switching when the input signal $V_P$ is lower than a threshold. The full bridge circuit is operated as a half bridge switching when the input signal $V_P$ is higher than the threshold. The operation of the half bridge switching is shown in FIG. 8A-FIG. 8D. The operation of the full bridge switching is shown in FIG. 9A-FIG. 9D. A line-voltage signal $V_{IN}$ is coupled to the control circuit 100. The full bridge circuit is operated as a full bridge switching when the line-voltage signal $V_{IN}$ is lower than a second threshold. The full bridge circuit is operated as a half bridge switching when the line-voltage signal $V_{IN}$ is higher than the second threshold. Through a resistor 61, the line-voltage signal $V_{IN}$ is generated by a line input voltage $V_{AC}$ of the power converter.

Furthermore, an inductor 60, a transistor 50, a rectifier 55, a capacitor 70 develop a PFC circuit to generate the input voltage $V_{PFC}$ for the full bridge circuit. The PFC circuit will generate a first input voltage $V_{PFC1}$ when the line-voltage signal $V_{IN}$ is lower than the second threshold. The PFC circuit will generate a second input voltage $V_{PFC2}$ when the line-voltage signal $V_{IN}$ is higher than the second threshold. The second input voltage $V_{PFC2}$ is higher than the first input voltage $V_{PFC1}$.

Figure 2:
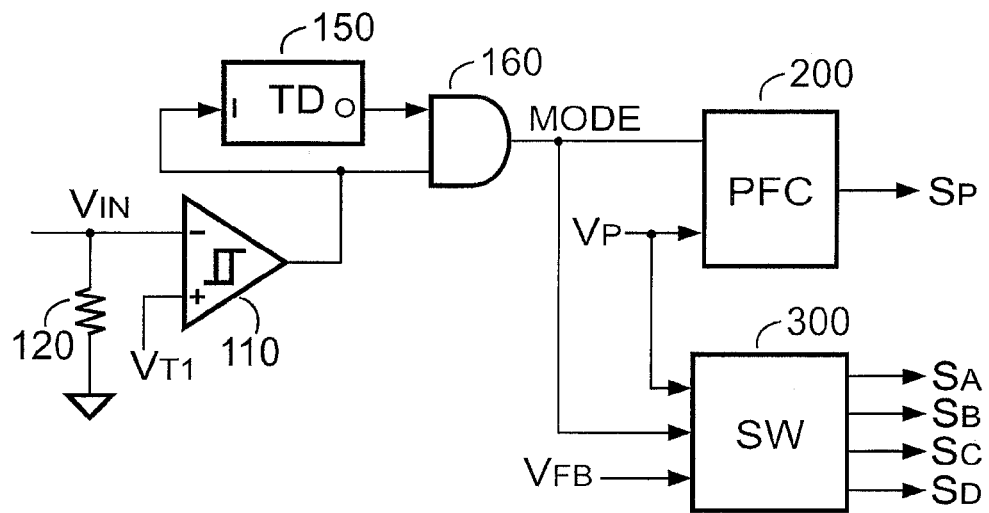
FIG. 2 is a preferred embodiment of a control circuit.

FIG. 2 is a preferred embodiment of the control circuit 100. The control circuit 100 includes a detection circuit coupled to receive the line-voltage signal $V_{IN}$ for generating a control signal MODE. A comparator 110, resistor 120, a delay circuit 150 and an AND gate 160 form the detection circuit. The control signal MODE will be generated to enable the full bridge switching once the line-voltage signal $V_{IN}$ is lower than a threshold signal $V_{T1}$. The delay circuit 150 provides a debounce for generating the control signal MODE. A PFC control circuit 200 is coupled to receive the input signal $V_P$ and the control signal MODE for generating a PFC switching signal $S_P$. The PFC switching signal $S_P$ is coupled to switch the transistor 50 and regulate the output of the PFC circuit. The output of the PFC circuit is the input voltage $V_{PFC}$ of the full bridge circuit. A switching circuit 300 is coupled to receive the feedback signal $V_{FB}$, the input signal $V_P$ and the control signal MODE for generating switching signals $S_A$, $S_B$, $S_C$, $S_D$. The switching signals $S_A$, $S_B$, $S_C$, $S_D$ are coupled to switch transistors 20, 25, 30, 35 respectively. The frequency of switching signals $S_A$, $S_B$, $S_C$, $S_D$ is varied in response to the feedback signal $V_{FB}$.

Figure 3:
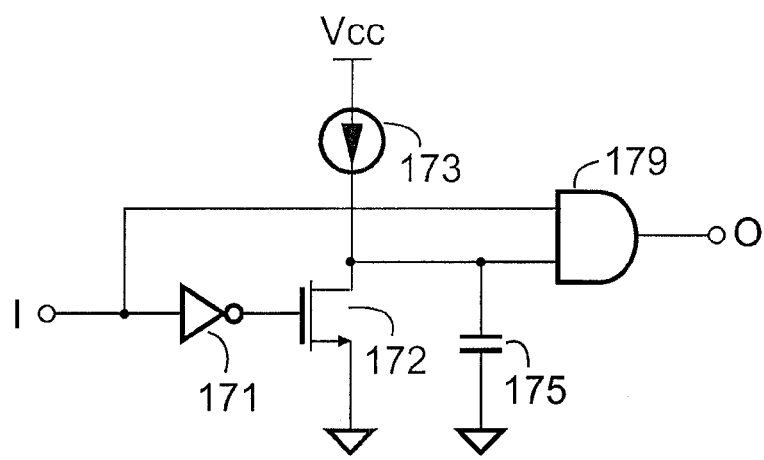
FIG. 3 shows the schematic of a delay circuit.

FIG. 3 shows the schematic of the delay circuit 150. An inverter 171, a transistor 172, a constant current source 173, a capacitor 175 and an AND gate 179 form the delay circuit 150. An input signal I is coupled to control the transistor 172 through the inverter 171. The current source 173 is connected to charge the capacitor 175. The input signal I is further coupled to an input of an AND gate 179. Another input of the AND gate 179 is coupled to the capacitor 175. Once the input signal I is enabled, an output of the AND gate 179 will generate an output signal O after a delay time. The delay time is determined by the current of the current source 173 and the capacitance of the capacitor 175.

Figure 4:
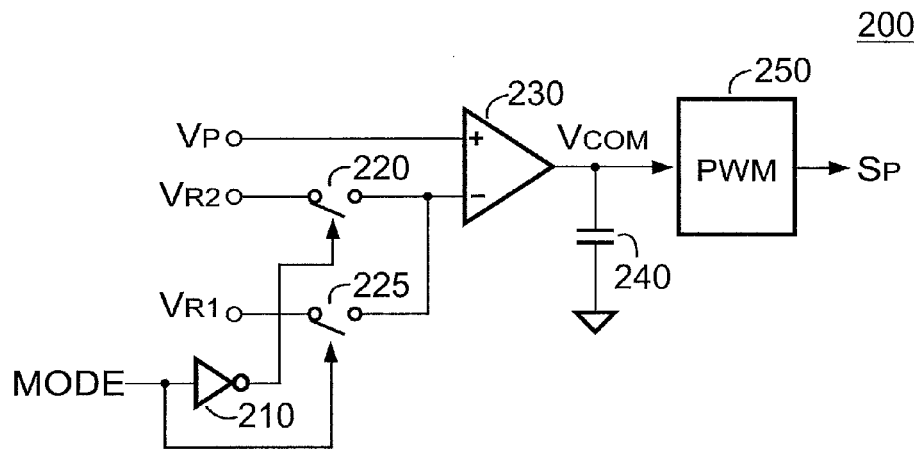
FIG. 4 is a preferred embodiment of a PFC control circuit.

FIG. 4 is a preferred embodiment of the PFC control circuit. An error amplifier 230 is coupled to receive the input signal $V_P$. Reference signals $V_{R1}$ and $V_{R2}$ are coupled to the input of the error amplifier 230 via switches 220 and 225. The control signal MODE controls the switch 225. The switch 220 is controlled by the control signal MODE through an inverter 210. Either reference signal $V_{R1}$ or $V_{R2}$ will be connected to the error amplifier 230. The output of the error amplifier 230 generates an amplified signal $V_{COM}$ coupled to a PWM control circuit 250 for generating the PFC switching signal $S_P$. Therefore, the PFC circuit will generate the second input voltage $V_{PFC2}$ or the first input voltage $V_{PFC1}$ in accordance with the reference signal $V_{R2}$ or $V_{R1}$.

Figure 5:
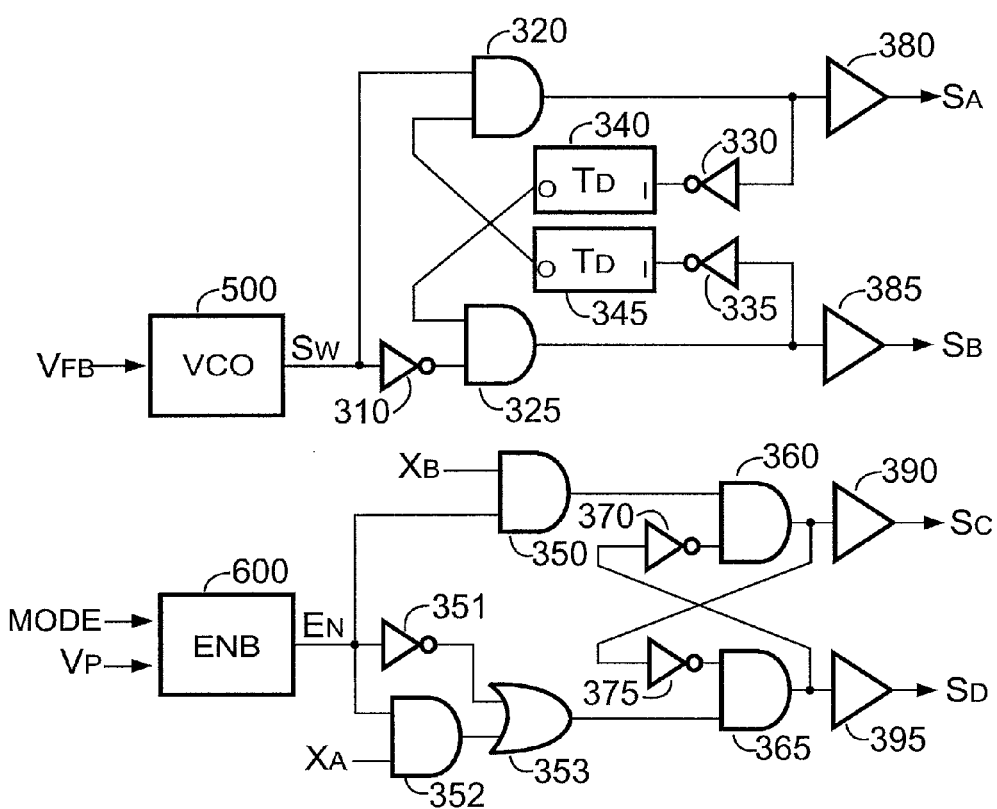
FIG. 5 is a preferred embodiment of a switching circuit in accordance with the present invention.

FIG. 5 is a preferred embodiment of the switching circuit 300 in accordance with the present invention. A voltage-control-oscillator 500 receives the feedback signal $V_{FB}$ for generating an oscillation signal $S_W$. AND gates 320, 325, inverters 310, 330, 335 and delay circuits 340, 345 develop an exclusive drive circuit. The exclusive drive circuit generates signals $X_A$, $X_B$ in response to the oscillation signal $S_W$. The signal $X_A$ generates the switching signal $S_A$ through an output driver 380. The signal $X_B$ generates the switching signal $S_B$ through an output driver 385. Delay circuits 340 and 345 provide the delay time (dead time) in between the turning on and the turning off of the switching signals $S_A$, $S_B$, $S_C$, $S_D$.

A mode-enable circuit 600 is coupled to receive the control signal MODE and the input signal $V_P$ for generating a mode-enable signal EN. The mode-enable signal EN is utilized to determine the full bridge switching or the half bridge switching for the full bridge circuit.

AND gates 350, 352, 360, 365, inverters 351, 370, 375 and an OR gate 353 develop another exclusive drive circuit for generating switching signals $S_C$ (third signal), $S_D$ (fourth signal) in response to the signals $X_A$ (first signal), $X_B$ (second signal) and the mode-enable signal EN. The switching signals $S_C$, $S_D$ will be generated in accordance with the signals $X_A$, $X_B$ when the mode-enable signal EN is enabled. When the mode-enable signal EN is disabled (logic-low), the switching signal $S_C$ will be turned off and the switching signal $S_D$ will be turned on. Output drivers 390 and 395 output the switching signals $S_C$, $S_D$.

Figure 6:
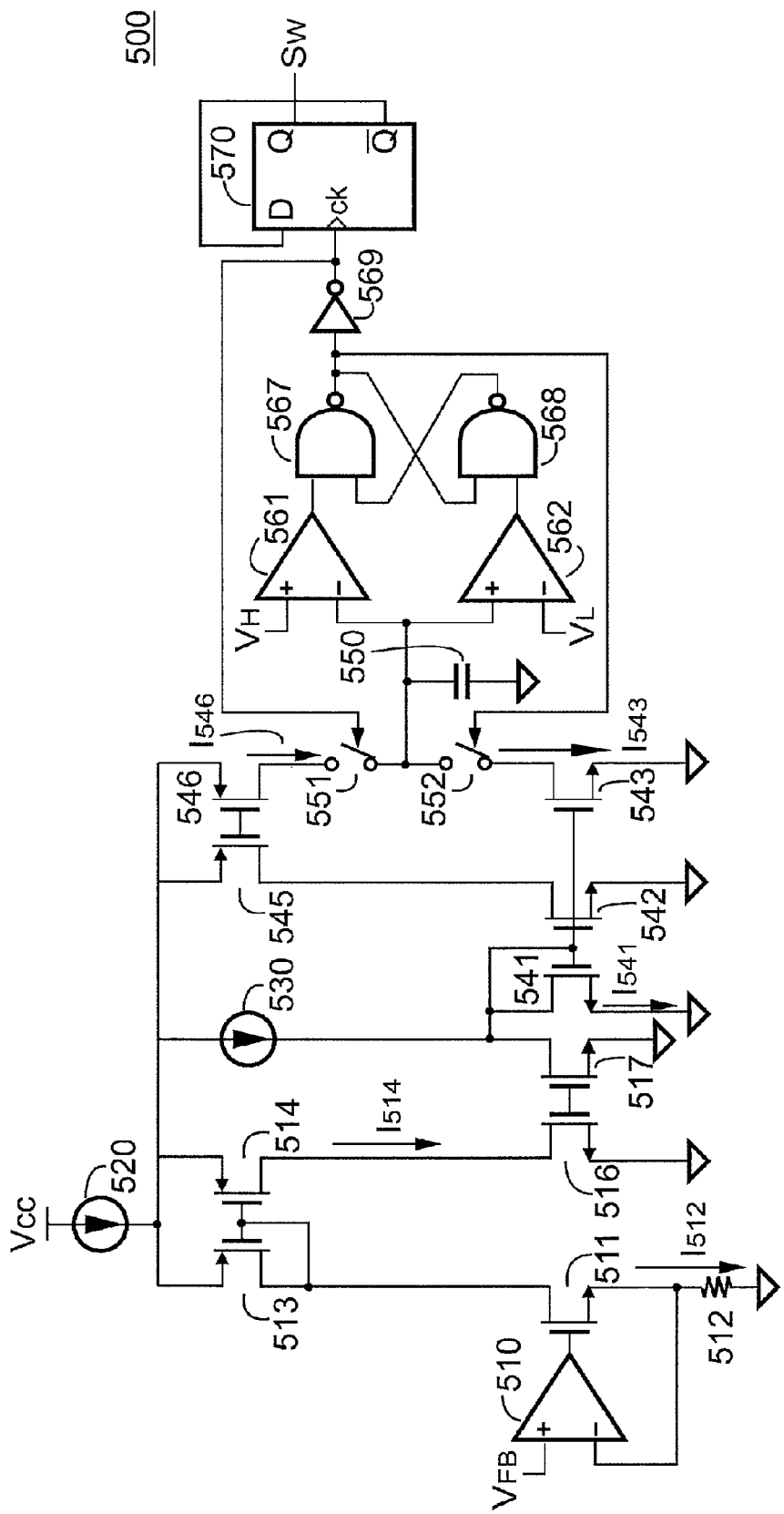
FIG. 6 is a circuit schematic of a voltage-control-oscillator in accordance with the present invention.

FIG. 6 is the circuit schematic of the voltage-control-oscillator 500 in accordance with the present invention. An operational amplifier 510, a transistor 511, and a resistor 512 develop a V-to-I circuit to generate a current I512 in response to the feedback signal $V_{FB}$. Transistors 513, 514 develop a current mirror to generate current $I_{514}$ in response to a current $I_{512}$. The maximum value of the current I514 is limited by a constant current source $I_{520}$. Transistors 516, 517, 541, 542, 543, 545 and 546 also develop other current minors to generate a current $I_{541}$, a charge current $I_{546}$ and a discharge current $I_{543}$. The current $I_{514}$ is coupled to generate the current $I_{541}$. The maximum value of the current $I_{541}$ is determined by a constant current source $I_{530}$. The current $I_{541}$ is further coupled to generate the charge current $I_{546}$ and the discharge current $I_{543}$ for charging and discharging a capacitor 550. The capacitor 550 generates a waveform signal in response to the on/off of switches 551, 552. In response to the waveform signal of the capacitor 550, comparators 561, 562, NAND gates 567, 568 and an inverter 569 generate control signals to control the switches 551, 552. The output of the inverter 569 is connected to the clock input of a D-flip-flop 570 for generating the oscillation signal $S_W$. The D-flip-flop 570 is connected to operate as a divided-by-two circuit, thus the oscillation signal $S_W$ is a 50% duty cycle signal. The frequency of the oscillation signal $S_W$ is increased in response to the decrease of the feedback signal $V_{FB}$ (light load). The current of the constant current source 530 determines the maximum frequency of the oscillation signal $S_W$. The frequency of the oscillation signal $S_W$ is decreased in response to the increase of the feedback signal $V_{FB}$ (heavy load). The current of the constant current source 530 and the current of the constant current source 520 determine the minimum frequency of the oscillation signal $S_W$.

Figure 7:
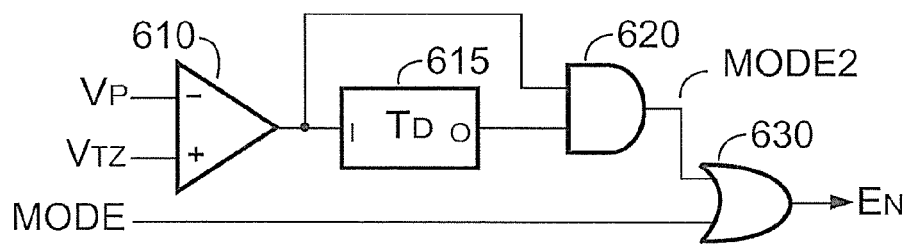
FIG. 7 shows a mode-enable circuit.

FIG. 7 shows the mode-enable circuit 600. A comparator 610, a delay circuit 615, an AND gate 620 form another detection circuit. A control signal MODE2 will be generated to enable the full bridge switching once the input signal $V_P$ is lower than a threshold signal $V_{T2}$. The delay circuit 615 provides a debounce for generating the control signal MODE2. An OR gate 630 is used for the enable of the mode-enable signal EN in response to the control signal MODE and the control signal MODE2.

FIG. 8A-FIG. 8D show the operation of the half bridge switching. The transistor 30 is off and the transistor 35 is on when the half bridge switching is performed. Transistors 20 and 25 are switching The output voltage $V_O$ can be expressed as, $$V_O = \text{Gain} \times \frac{V_{PFC}}{2 \times n} \times \eta, \qquad (1)$$

Figure 10:
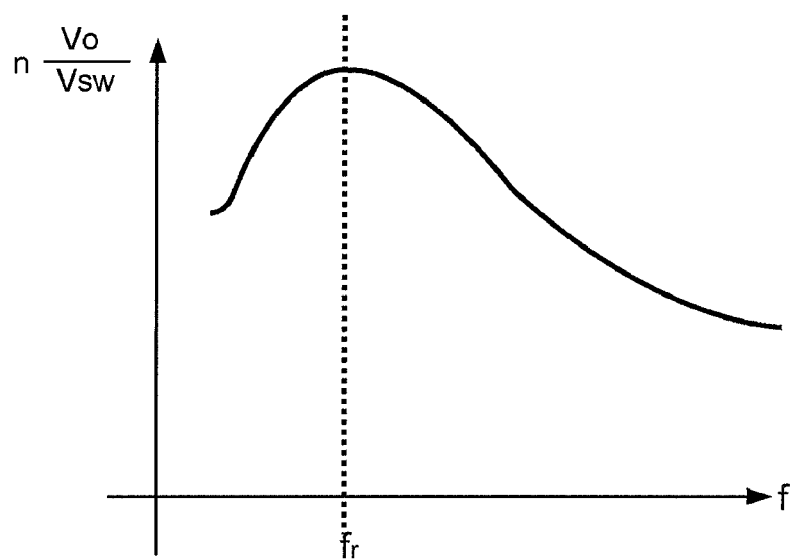
FIG. 10 shows an example of Gain.

, where the $V_{PFC}$ is the voltage of the input voltage $V_{PFC}$, the n is the transformer's turn ratio, the η is the efficiency, and the Gain is related to the Q factor of the resonant tank. The example of the Gain is shown in FIG. 10, in which the $V_W$ is the voltage across the resonant tank (it is the $V_{PFC}$ or $V_{PFC}/2$).

Figure 8A:
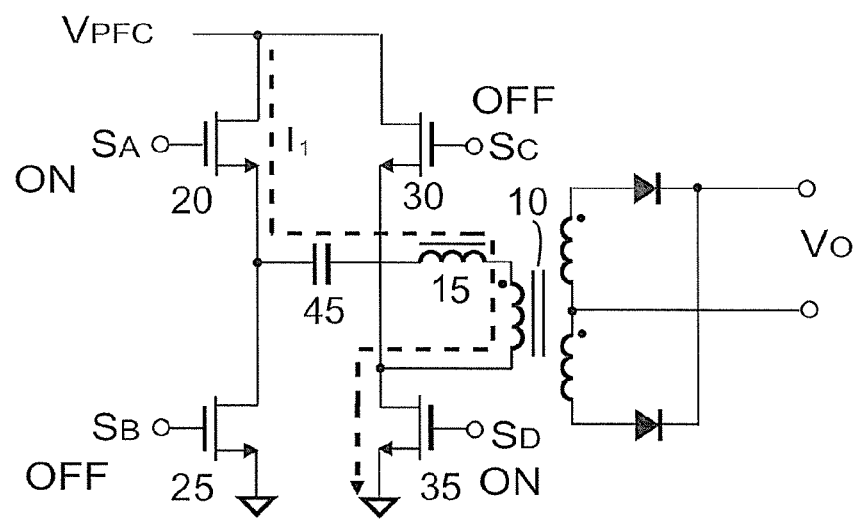
FIG. 8A-FIG. 8D show the operation of a half bridge switching.
Figure 8B:
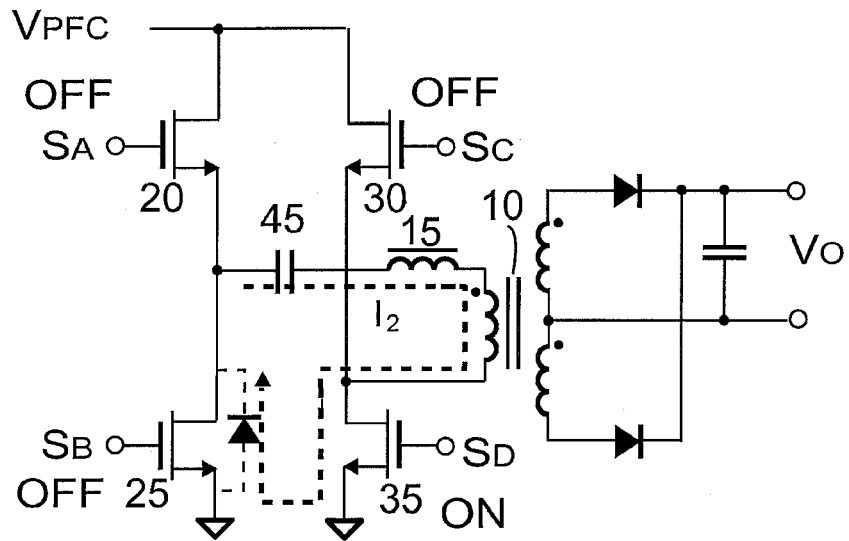

At the beginning of each switching cycle, as shown in FIG. 8A, the switches 20 and 35 are switched on, the current $I_1$ flows from the input voltage $V_{PFC}$ through the switch 20, capacitor 45, the inductive device 15 and switch 35 across the primary winding of the transformer 10. Therefore, the energy is delivered from primary circuit to secondary circuit. The energy is thus delivered to the output terminal and output with an output voltage $V_O$. In FIG. 8B the switches 20 are switched off, and a current $I_2$ is induced flowing from the primary winding of the transformer 10 to the parasitic diode of the switches 25.

Figure 8C:
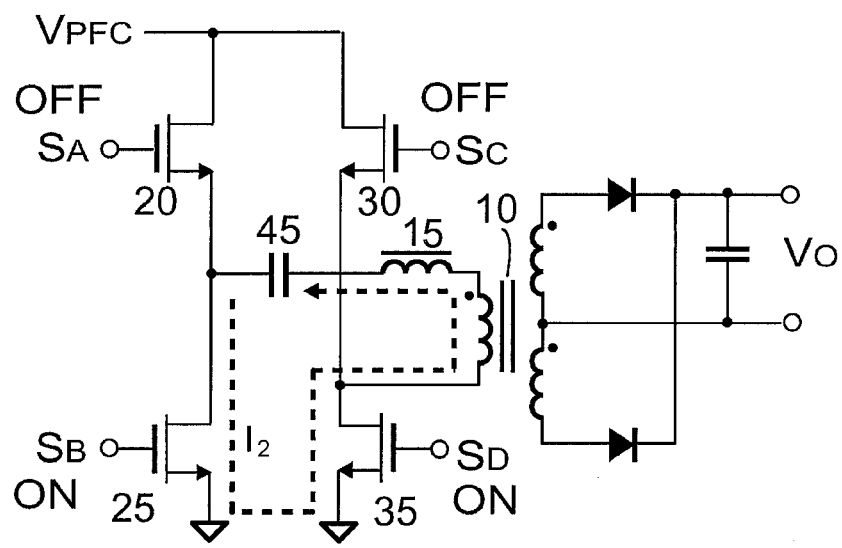
Figure 8D:
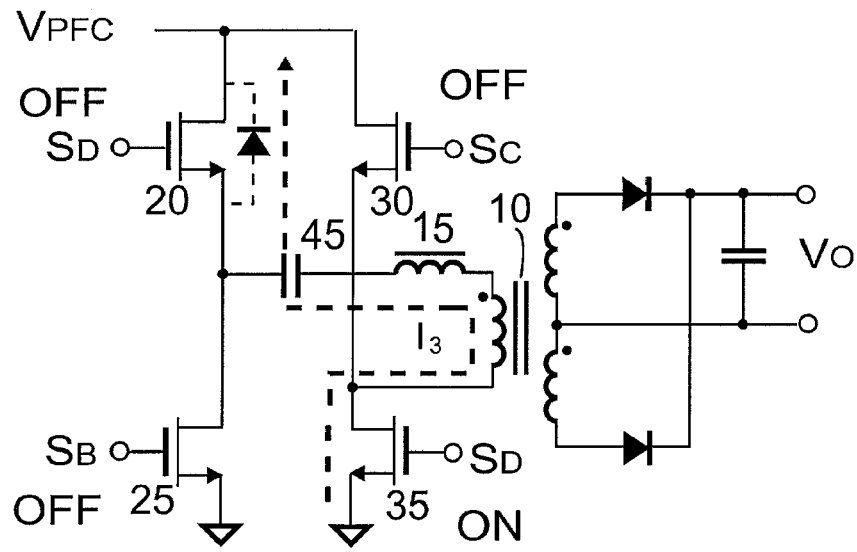

In FIG. 8C, the switch 25 is switched on, the current $I_3$ flows from the switch 25 to the primary winding of the transformer 10 and then to the inductive device 15 and the capacitor 45 for discharging. In FIG. 8D, the switch 25 is turned off, a current $I_4$ is induced flowing from the primary winding of the transformer 10 to the input voltage $V_{PFC}$ via the parasitic diode of the switches 20.

FIG. 9A-FIG. 9D show the operation of the full bridge switching, the output voltage $V_O$ can be defined as, $$V_O = \text{Gain} \times \frac{V_{PFC}}{n} \times \eta. \qquad (2)$$

Figure 9A:
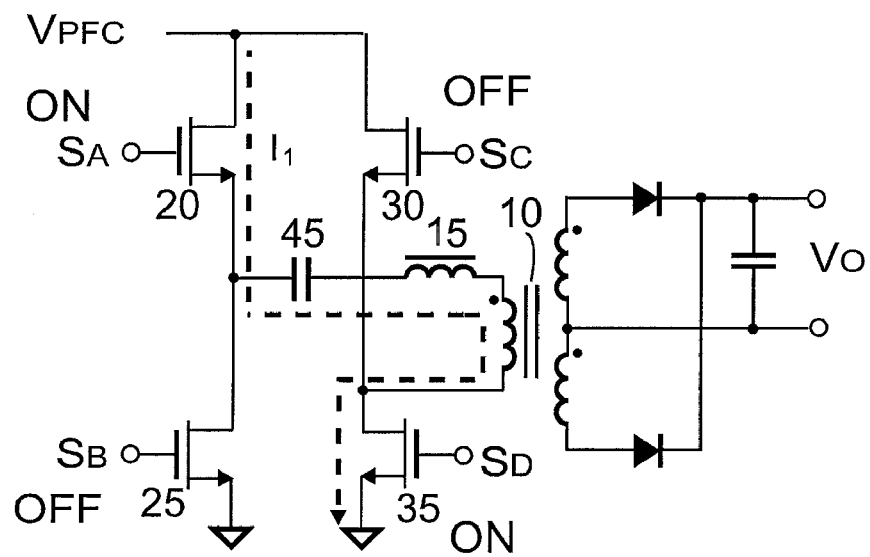
FIG. 9A-FIG. 9D show the operation of a full bridge switching.
Figure 9B:
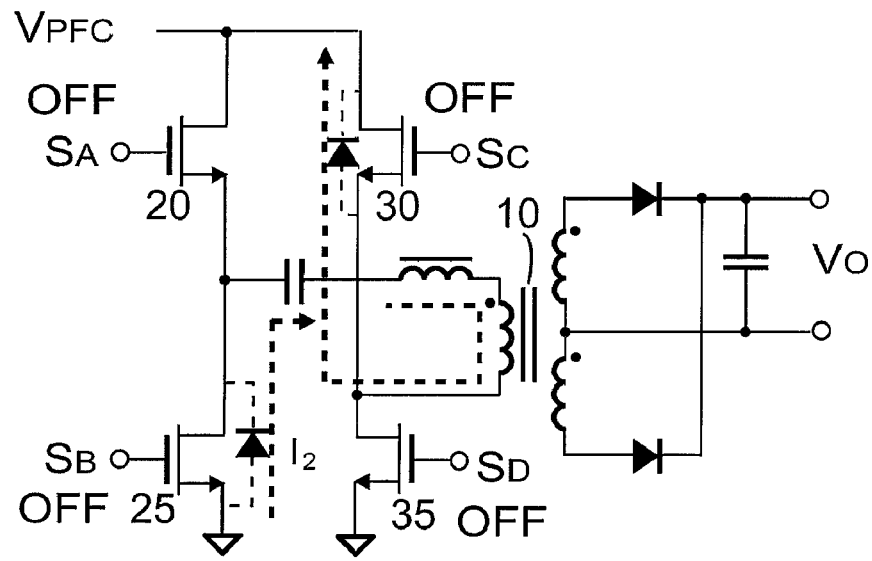

At the beginning of each switching cycle, as shown in FIG. 9A, the switches 20 and 35 are switched on, the current $I_1$ flows from the input voltage $V_{PFC}$ through the switch 20, capacitor 45, the inductive device 15 and switch 35 across the primary winding of the transformer 10. Therefore, the energy is delivered from primary circuit to secondary circuit. The energy is thus delivered to the output terminal and output with an output voltage $V_O$. In FIG. 9B the switches 20 and 35 are switched off, and a current $I_2$ is induced flowing from the primary winding of the transformer 10 to the input voltage $V_{PFC}$ via the parasitic diodes of the switches 25 and 30.

Figure 9C:
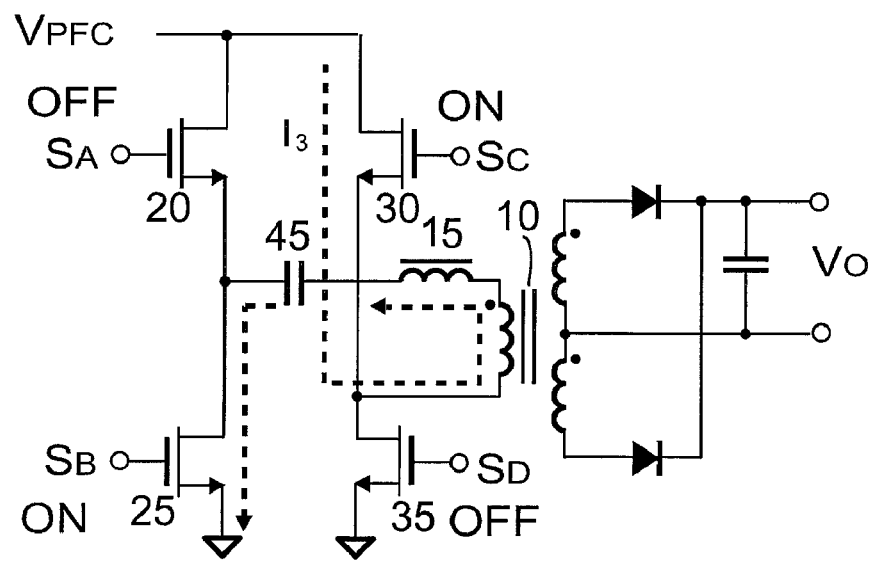
Figure 9D:
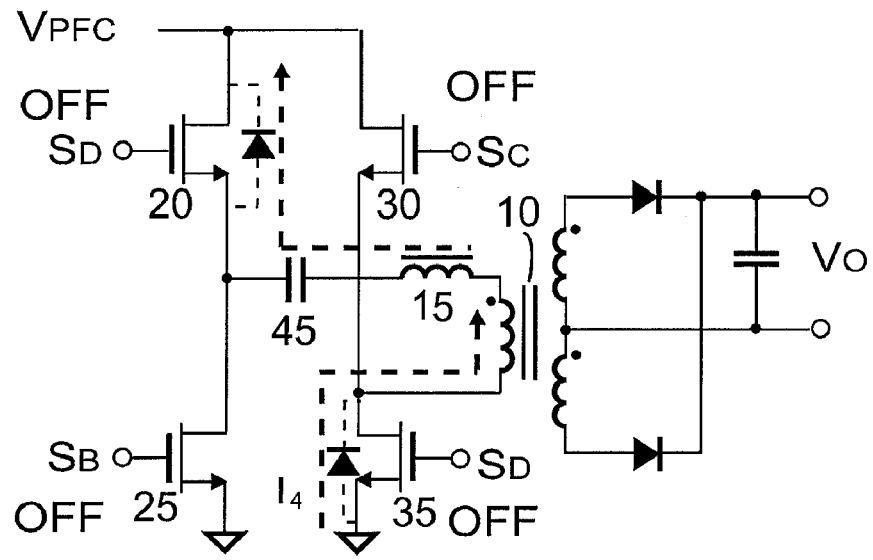

In FIG. 9C, the switches 25 and 30 are switched on, the current $I_3$ flows from the input voltage $V_{PFC}$ through the switch 30, the inductive device 15, capacitor 45, and switch 25 across the primary winding of the transformer 10. Therefore, the energy is delivered from primary circuit to secondary circuit. The energy is thus delivered to the output terminal and output with an output voltage $V_O$. In FIG. 9D the switches 25 and 30 are switched off, and a current $I_4$ is induced flowing from the primary winding of the transformer 10 to the input voltage $V_{PFC}$ via the parasitic diodes of the switches 35 and 20. The full bridge circuit will operate the full bridge switching when its input voltage $V_{PFC}$ is low. The half bridge switching will be performed when its input voltage $V_{PFC}$ is high. The PFC circuit is not necessary to produce a high output voltage when the line input voltage $V_{AC}$ is low. Therefore, a higher efficiency and wider operation range for the power converter are achieved.

Although the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:
1. A resonant power converter comprising:
 a full bridge circuit for switching a power transformer in response to switching signals;
 a control circuit coupled to receive a feedback signal and also coupled to the full bridge circuit to receive an input signal for generating switching signals; in which the feedback signal is correlated to the output of the resonant power converter and the input signal is correlated to the input voltage of the full bridge circuit,
 wherein the full bridge circuit is operated as a full bridge switching when the input signal is lower than a threshold; and the full bridge circuit is operated as a half bridge switching when the input signal is higher than the threshold.

2. The resonant power converter as claimed in claim 1, in which the control circuit is further coupled to receive a line-voltage signal; wherein the full bridge circuit is operated as a full bridge switching when the line-voltage signal is lower than a second threshold; and the full bridge circuit is operated as a half bridge switching when the line-voltage signal is higher than the second threshold; the line-voltage signal is correlated to a line input voltage of the resonant power converter, and the line-voltage signal is generated by the line input voltage.

3. The resonant power converter as claimed in claim 2, further comprising:
 a PFC circuit generating the input voltage of the full bridge circuit;
 wherein the PFC circuit generates a first input voltage when the line-voltage signal is lower than the second threshold; and the PFC circuit generates a second input voltage when the line-voltage signal is higher than the second threshold; the second input voltage is higher than the first input voltage.

4. The resonant power converter as claimed in claim 1, in which the control circuit comprising:
 a switching circuit generating switching signals in response to the feedback signal and the input signal; in which switching signals comprises a first signal, a second signal, a third signal and a fourth signal;
 wherein the frequency of switching signals is varied in response to the feedback signal; switching signals are switching alternatively for the full bridge switching; the third signal is off, the fourth signal is on, and the first signal and the second signal are switching for the half bridge switching.

5. A method for the control of a resonant power converter comprising:
 generating switching signals to drive a full bridge circuit in response to a feedback signal and an input signal, wherein the input signal is received through coupling to the full bridge circuit;
 full bridge switching a power transformer in response to switching signals when an input signal is lower than a threshold;
 half bridge switching the power transformer in response to switching signals when the input signal is higher than the threshold;
 wherein the feedback signal is correlated to the output of the resonant power converter and the input signal is correlated to the input voltage of the full bridge circuit.

6. The method as claimed in claim 5, further comprising:
 generating switching signals in response to a line-voltage signal;
 full bridge switching a power transformer in response to the switching signals when the line-voltage signal is lower than a second threshold;
 half bridge switching the power transformer in response to the switching signals when the line-voltage signal higher than the second threshold;

wherein the line-voltage signal is correlated to the line input voltage of the resonant power converter, and the line-voltage signal is generated by the line input voltage.

7. The method as claimed in claim 6, further comprising:
generating the input voltage of the full bridge circuit by a PFC circuit;
wherein the PFC circuit generates a first input voltage when the line-voltage signal is lower than the second threshold; and the PFC circuit generates a second input voltage when the line-voltage signal is higher than the second threshold; the second input voltage is higher than the first input voltage.

8. The method as claimed in claim 5, in which the switching signals comprising:
a first signal, a second signal, a third signal and a fourth signal;
wherein the frequency of switching signals is varied in response to the feedback signal; the switching signals are switching alternatively for the full bridge switching; for the half bridge switching, the third signal is off, the fourth signal is on, and the first signal and the second signal are switching.

* * * * *